United States Patent [19]

Cockayne

[11] 4,214,844
[45] Jul. 29, 1980

[54] DISPENSING DEVICES

[75] Inventor: David J. Cockayne, Sutton Coldfield, England

[73] Assignee: Modular Automation Limited, West Midlands, England

[21] Appl. No.: 897,135

[22] Filed: Apr. 17, 1978

[30] Foreign Application Priority Data

Apr. 19, 1977 [GB] United Kingdom ............... 16119/77
Aug. 10, 1977 [GB] United Kingdom ............... 33630/77

[51] Int. Cl.² .............................................. B65G 51/02
[52] U.S. Cl. .................................... 406/123; 198/953; 406/137
[58] Field of Search ..................... 302/2 R; 198/953; 214/8.5 E; 221/200, 278; 406/136, 137, 123; 414/116

[56] References Cited

U.S. PATENT DOCUMENTS

| | | | |
|---|---|---|---|
| 2,657,812 | 11/1953 | Fox | 214/8.5 E |
| 3,346,305 | 10/1967 | Heymann | 198/953 |
| 3,625,570 | 12/1971 | Ford | 302/2 R |
| 4,035,029 | 7/1977 | Lindstrom et al. | 302/2 R |

FOREIGN PATENT DOCUMENTS 522042  9/1976  U.S.S.R. .................................. 302/2 R

Primary Examiner—Jeffrey V. Nase
Attorney, Agent, or Firm—Neil F. Markva

[57] ABSTRACT

A compressed air operated dispenser for separating and dispensing small helical coil springs or other small elongate workpieces comprises a trough providing a dispensing chamber into which the workpieces can be introduced to form a loosely packed bed in the bottom part thereof. An air supply mechanism effects blowing jets of compressed air intermittently, in a downwards direction, into the bottom part adjacent one side of the trough such that the compressed air is caused to sweep over the interior bottom surface by which it is deflected into an upwardly directed airstream adjacent the opposite side, thereby creating turbulence effective to agitate and carry upwards at least some of the workpieces to outlet apertures disposed in the upper part of the trough in the path of the upwardly directed airstream. The outlet apertures are of such size as to permit individual workpieces entrained in the air flow to pass successively in single file therethrough in relative endwise orientated and aligned relationship to discharge together with the compressed air.

16 Claims, 3 Drawing Figures

DISPENSING DEVICES

FIELD OF INVENTION

This invention relates to compressed air operated dispensers for separating and dispensing small elongate workpieces such as, for example, small screws, rivets, helical coil springs, pins or other lightweight small metal components of elongate form.

BACKGROUND OF INVENTION

More particularly, it relates to such dispensers of a kind in which there is a dispensing chamber for containing a quantity of the workpieces and means are provided for blowing compressed air into the dispensing chamber so as to create a turbulence which agitates the workpieces such that some of the workpieces become entrained in the air flow and are discharged singly from the dispensing chamber, together with the compressed air, through one or more outlet openings.

One prior art example of a dispenser of the above kind is that disclosed in United Kingdom Pat. No. 1281523 in which the dispensing chamber is provided by an upright cylindrical vessel and means are provided for blowing intermittent jets of compressed air vertically upwards into the chamber, through the central region of the bottom end and through the workpieces therein, to create the turbulence which agitates and carries the workpieces upwards in random motion and causes some of them to discharge through an outlet in the upper part of the chamber.

Such devices are especially useful for dispensing small helical coil springs because, although these usually tend to entangle together such as to make handling difficult, the impacts to which they are subjected in a dispenser of the kind referred to can perform a useful and efficient separating function.

Thus, another prior art dispenser of the kind referred to, especially designed for the above purpose of entangling small helical coil springs, is that disclosed in U.S. Pat. No. 3346305. In this case, it was proposed to introduce the compressed air horizontally into a tilted cylindrical vessel in a direction oblique to a diameter so as to produce an upwardly moving vortex swirling about a substantially vertical axis to agitate and separate the springs and to lift them in a spiral path up to a discharge outlet through which they are guided with an abrupt change of direction in their movement by adjacent deflector means.

It has been realised, however, that there is scope for improvement in such prior art dispensers, both in respect of their physical structural form and their potential operating efficiency.

SUMMARY OF THE INVENTION

Accordingly the present invention provides a compressed air operated dispenser device for separating and dispensing small elongate workpieces such as, for example, small screws, rivets, helical coil springs, pins and other lightweight small metal components of elongate form, wherein there is a dispensing chamber into which a quantity of the workpieces can be introduced so as to lie loosely in the bottom part thereof, air supply means for blowing compressed air intermittently into the dispensing chamber thereby to create turbulence effective to agitate and carry upwards at least some of the workpieces therein, and outlet means in the upper part of the chamber comprising at least one outlet aperture defined by an exposed open end of an outlet passage facing inwardly into the chamber of such size as to permit individual workpieces entrained in the air flow to pass successively in single file therethrough in relative endwise orientated and aligned relationship to discharge together with the compressed air, and wherein said dispensing chamber is formed by a trough having opposite side walls and a bottom section which extends between said side walls and which provides an interior bottom surface, and said air supply means comprises inlet means adapted and arranged to introduce the compressed air into the dispensing chamber in the form of jets, said jets of compressed air being directed into said bottom part within a first localized region so as to pass through a bed of said workpieces lying loosely therein and to impinge against at least a portion of said interior bottom surface such that the compressed air is caused to sweep over said bottom surface and to be deflected thereby into an upwardly directed air stream which emerges from said bottom part within a second localized region, the outlet means being disposed directly in the path of said upwardly directed air stream.

The trough will generally have a substantially U-shaped configuration in transverse vertical cross-section with a curved bottom surface extending between opposite side walls, and the first localized region wherein the air is blown into the bottom part will generally be adjacent one side of the trough with the second localized region wherein the air is projected upwards will generally be adjacent the opposite side of the trough.

The arrangement enables the air inlet to be disposed in either the top or side walls of the chamber structure, and the outlet may be in the top so that the workpieces are discharged in a direction parallel but opposite to the direction of the air introduced, or at right angles thereto, or at any other angle greater than 90°.

The arrangement further facilitates the production of simplified structural designs for the device, and in some embodiments both the inlet means and the outlet means may advantageously be provided in a single structural member at the top of the trough.

Preferably, the inlet means is arranged to introduce the compressed air in a downwards direction.

The trough can be of annular form with the inlet means provided by a series of jet orifices spaced circumferentially around the outer periphery and with the outlet means provided by one or more outlet openings or ports spaced circumferentially around the inner periphery, the inlet means and the outlet means both conveniently being carried by a common lid structure which closes the top of the trough.

In preferred embodiments, however, the trough is of substantially rectangular form in horizontal cross-section, and the inlet means is provided by a series of jet orifices spaced along the length of the trough adjacent the top of one of the side walls so as to direct and blow the compressed air downwards into the bottom part. In this form of construction, the outlet means is also preferably provided by a series of outlet openings or ports spaced along the length of the trough in the path of the air stream after it has swept around the bottom of the trough and has been deflected upwardly adjacent the opposite side wall.

In some cases, in deflecting the air within the chamber from a downwards flow to an upwards flow it is desirable that the main upwards flowstream should be spaced from the adjacent side wall of the chamber and an improved flow pattern for the air can be obtained by further deflecting the air so that it is directed away from the said chamber side wall in order that it can be projected more directly towards the outlet openings or ports. This can conveniently be achieved by providing an auxiliary deflector element in the form of a ridge or bar which projects inwardly to provide a modified deflecting surface of ramp form or other appropriate profile presented transversely to the air stream in the lower part of the chamber. The profile, and particularly the position, of such deflector element can be important for obtaining the best performance, but generally it will be related to the relative position and configuration of the outlet apertures or ports and adjacent surfaces facing into the chamber, and it may to some extent depend on the physical characteristics of the workpieces and operating conditions of the device. In some cases, however, depending on the above factors such auxiliary deflector element may not be necessary at all to obtain optimum performance and a smooth curved bottom surface of the trough may suffice.

When such deflector element is required it may be a separate member which is fixed or bonded to the inner surface of the chamber after a suitable position has been established experimentally for a particular dispenser, or it could if desired be adjustably mounted, with slot and screw fixings for example, which would enable it to be set according to circumstances.

In any case, in preferred embodiments designed for dispensing springs the outlet openings or ports at the top of the chamber are generally located at a distance inwardly from the main side wall of the chamber substantially in alignment with the direction in which the upwards air stream leaves the internal deflecting surfaces during normal operation and are defined by the open ends of outlet passages of outlet nozzles which terminate in substantially flush relationship with an inwardly presented abutment surface at the top of the chamber. This surface may be a planar face of a block or other body in which the outlet nozzles are mounted and which forms part of the structure extending across and covering over the top of the chamber.

It is, moreover, generally advantageous for this abutment surface surrounding the outlet openings or ports to lie in a plane extending transversely at a substantial angle of at least 45°, and preferably substantially at right angles, to the direction at which the upwardly directed air stream is projected, although it will of course be appreciated that the outlet passages of the outlet nozzles may extend obliquely to said surface so that the outlet openings or ports have a somewhat elliptical form thereby increasing the effective cross-sectional area and increasing the chances of capturing a spring without having to enlarge the bore diameter of the passages to a point at which a pair of springs entangled together could enter and cause blockages.

With a trough shaped chamber, the inlet and outlet nozzles may be mounted in separate blocks or bodies extending along the length of the trough at the top of the opposite side walls, the whole structure being fitted in a casing which houses the control system for the compressed air supply, and the two blocks or bodies may provide a seating for a hinged lid component which opens to enable the workpieces to be introduced into the chamber.

BRIEF DESCRIPTION OF DRAWINGS

Other objects of this invention will appear in the following description and appended claims, reference being made to the accompanying drawings forming a part of the specification wherein like reference characters designate corresponding parts in the several views.

Figure 1:
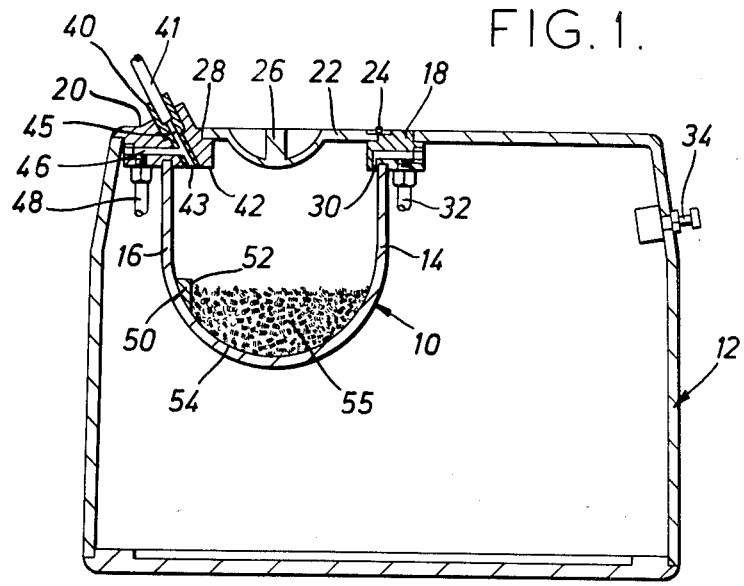
FIG. 1 is a cross-sectional view of a first embodiment of a dispenser made in accordance with this invention.
Figure 1A:
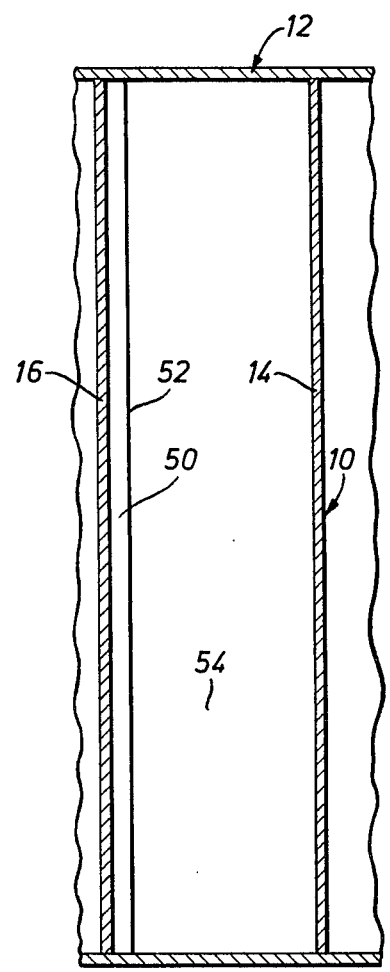
FIG. 1a is a fragmentary sectional view through the dispensing chamber of the dispenser as shown in FIG. 1.

An example of the layout of a spring dispenser having the above-mentioned general form of construction is illustrated somewhat diagrammatically in vertical cross-section in FIG. 1 and in horizontal cross-section in FIG. 1a in the accompanying drawings. The dispensing chamber is formed by the U-shaped trough 10, conveniently molded in plastics material and mounted in a larger rectangular casing 12. Opposite side walls of casing 12 close the ends of trough 10 and may include transparent viewing windows.

The trough 10 has opposite side walls 14 and 16 which, at the top, fit into metal blocks 18 and 20 secured to casing 12. The top of the chamber is closed by a lid 22 hingedly mounted at 24 to block 18. Lid 22 has a finger grip 26 and its free end seats in a recess 28 of block 20.

Inlets for introducing compressed air into the chamber are provided by a series of downwardly directed jet orifices 30 spaced along the length of the underside of block 18. Orifices 30 communicate through transverse passages and a longitudinal gallery with an air supply tube 32 connected to an air flow control circuit including control valves and an associated timer (not shown) housed in the casing 12. Adjustable means, such as the knob control 34, are provided for regulating the flow through tube 32 as required.

The outlets for the springs and compressed air comprise a series of outlet nozzles 40, one of which is shown, detachably mounted in the other block 20 at intervals along its length. Each nozzle 40 is connected in use to an outlet feed tube 41 and, as shown, is set obliquely so that the outlet passage therein is at an angle, about 60° in this case, to the lower flat horizontal face or abutment surface 42 of the block. The end of each nozzle 40 also lies in substantially flush relationship with the face 42 and it will be appreciated that the outlet openings or ports 43 presented to the interior of the chamber will appear somewhat elliptical or oval in profile. As shown in the drawings, the outlet passage at the end of each nozzle is laterally spaced from the side wall 16 which is adjacent the upwardly directed airstream. Thus, there is a freeflight path for the workpieces when moving toward the outlet passage. The bore of the outlet passage 45 in the nozzles 40 is obviously made sufficiently large to permit free movement therethrough of the springs to be dispensed taken one at a time and in end to end alignment but it is not made large enough to permit two closely intertwined springs to pass. In practice, an appropriate size for giving a satisfactory discharge rate with minimum risk of blockages can be determined empirically and different sizes of nozzles will be provided for different sizes of spring.

Additional small bore passages 46 leading through ports into the main outlet passage 45 of each outlet nozzle 40 are also provided in the block 20 for enabling compressed air, supplied through pipe 48, to be blown in a reverse direction through the outlet openings or ports 43 for clearing any blockages or obstructions that may arise. This blow-back is usually arranged to take place automatically at intervals, in between periods of supplying air to the inlet orifices 30 in block 18, as part of a continuous predetermined cycle of operations set by the control circuit.

An auxiliary deflector element in this embodiment is provided by a bar 50, extending along the length of the trough, which projects inwardly into the interior of the chamber at the bottom of the side wall 16. Bar 50 includes a deflector surface 52 of ramp form merging with the curved bottom wall 54 of the trough and directed vertically towards the outlet openings or ports 43 above. This bar 50 may be in the form of a separate element bonded or otherwise fixed to the wall structure of the trough 10 or it may be integrally molded therewith if its position is predetermined and if no adjustment capability is required.

In use, a quantity of suitable spring workpieces is introduced into the chamber so as to lie as a loosely packed bed 55 in the bottom of the trough 10 and the device is set in operation so that the compressed air is introduced into the chamber intermittently in short bursts of controllable duration through the inlet nozzles 30. With each burst the air is blown downwards from the jet orifices 30 so as to enter the bed of springs from the top, adjacent the side wall 14, and is deflected by the curved bottom wall 54 and ramp deflector surface 52 through an angle of approximately 180°. Thereby the air is projected towards the underface 42 of the outlet block 20 and a general turbulence is set up within the chamber, including possibly at least a partial vortex motion, such that the spring workpieces are brought into a state of at least partially floating or suspended agitation, many of them being carried upwards and entrained in the air stream. And, as the air escapes through the outlet nozzles 43, a certain number of the springs which in their random motion become endwise orientated opposite one or other of the outlet openings or ports 43 are carried along with the escaping air and, one at a time, enter the outlet passages 45 to discharge in single file through the nozzles into the feed tubes 41 wherein they are conveyed to a remote discharge point.

During this operation many of the springs are also driven against interior surfaces facing inwardly of the chamber and the impact with these surfaces, especially the impact with the lower face 42 of the outlet block and to some extent the impact against the deflector element 50, together with the movement of the air stream, is effective in separating springs which have become entangled together, thereby permitting the springs to be discharged individually.

As mentioned previously, the blow-back operation also takes place periodically so that passages 45 in the outlet nozzles 40 are kept clear of any obstructions which may temporarily arise.

Figure 2:
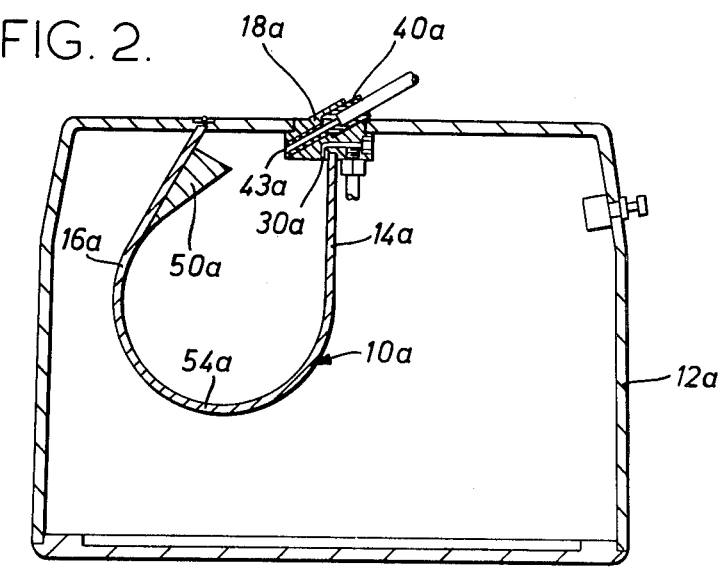
FIG. 2 is a cross-sectional view of another embodiment of a dispenser made in accordance with this invention.

The apparatus may also be further modified so that the deflecting surfaces within the dispensing chamber deflect the air flow back towards the inlet side so that the outlet nozzles may be adjacent the inlet nozzles, and it may be possible with advantage to incorporate both the inlet and outlet nozzles in a common carrier block or body. Thus, as illustrated schematically by way of example in FIG. 2 of the accompanying drawings, the apparatus previously described may be modified by a somewhat different shaping of the trough, indicated at 10a, with curved bottom surface 54a and side walls 14a and 16a, and different shaping and positioning of the deflector element 50a, to deflect the air through an angle of approximately 225°. The outlet nozzles 40a, having outlet openings or ports 43a, are mounted in the same block 18a as provides the inlet jet orifices 30a.

The air supply and flow control circuit can of course be of a conventional design and need not be described in detail.

Dispensers as described have been found to be capable of providing an exceptionally high efficiency, especially for springs, and have a simple construction enabling them to be made in the form of compact portable units.

I claim:

1. A compressed air operated dispenser device for separating and dispensing helical coil springs, said dispenser device comprising:
   (a) a dispensing chamber into which a quantity of the coil springs can be introduced, so as to lie loosely in the bottom part thereof,
   (b) air supply means for blowing compressed air intermittently into the dispensing chamber thereby to create turbulence effective to agitate and carry upwards at least some of the coil springs therein,
   (c) outlet means in the upper part of the chamber comprising at least one outlet aperture defined by an exposed open end of an outlet passage facing inwardly into the chamber of such size as to permit individual coil springs entrained in the air flow to pass successively in single file therethrough in relative endwise oriented and aligned relationship to discharge together with the compressed air, and
   (d) abutment means disposed within said dispensing chamber and against which said coil springs are forcibly directed while entrained in the air flow,
   (e) said dispensing chamber is formed by a trough having opposite side walls and a bottom section which extends between said side walls and which provides an interior bottom surface,
   (f) said air supply means comprises inlet means adapted and arranged to introduce the compressed air into the dispensing chamber in the form of jets,
   (g) said jets of compressed air being directed into said bottom part within a first localized region so as to pass through a bed of said coil springs lying loosely therein and to impinge against at least a portion of said interior bottom surface such that the compressed air is caused to sweep over said bottom surface and to be deflected thereby into an upwardly directed air stream which emerges from said bottom part within a second localized region,
   (h) the outlet means being disposed directly in the path of said upwardly directed air stream.

2. A device as claimed in claim 1, wherein
the trough has a substantially U-shaped configuration in transverse vertical cross-section and
the inlet means comprises a series of jet orifices spaced along the length of the trough in the upper part thereof and arranged so as to blow the compressed air downwardly into the bottom part adjacent one side wall,
the interior bottom surface being effective to deflect the compressed air through an angle of at least 180° and to cause it to be projected upwardly adjacent the opposite side wall toward the outlet means, said outlet means comprising a plurality of said outlet apertures also spaced along the length of the trough in the upper part thereof.

3. A device as claimed in claim 2, wherein said abutment means includes a deflector element which comprises an inwardly projecting longitudinal ridge member extending along the interior surface of the trough to give said surface the required profile for directing the compressed air toward the outlet means.

4. A device as claimed in claim 2, wherein two block structures disposed at the top of the opposite side walls respectively include said inlet means and said outlet means.

5. A device as claimed in claim 2, wherein a single block structure located at the top of the trough includes said inlet means and said outlet means.

6. A device as claimed in claim 2, wherein the trough is of substantially rectangular form in horizontal cross-section and is mounted so as to extend transversely in a box-like casing which supports a control for the air supply means.

7. A compressed air operated dispenser device for separating and dispensing small elongate workpieces such as, for example, small screws, rivets, helical coil springs, pins and other lightweight small metal components of elongate form, said dispenser device comprising:
(a) a dispensing chamber having side walls and effective to contain a quantity of the workpieces,
(b) air supply means for blowing compressed air into the dispensing chamber to create turbulence effective to agitate and carry upwards in a free flight path at least some of the workpieces therein,
(c) outlet means located in the upper part of the chamber and having an outlet passage facing inwardly into the chamber,
(d) said outlet passage being at a location laterally spaced inwardly of the chamber with respect to said side walls to permit individual workpieces entrained in the air flow of the free flight path to pass successively in single file therethrough in relative endwise orientated and aligned relationship to discharge together with the compressed air, and
(e) abutment means disposed within said dispensing chamber and including an abutment surface against which the workpieces are forcibly directed while entrained in the air flow to cause said workpieces to move upwardly in said free flight path.

8. A device as claimed in claim 7, wherein said abutment means further includes another abutment surface adjacent the outlet passage.

9. A device as claimed in claim 7, wherein said abutment surface is located on a deflector element which is disposed along a side wall of the chamber and effective to direct compressed air toward the outlet passage.

10. A device as claimed in claim 7, wherein said outlet means comprises a plurality of outlet apertures spaced along the length of the trough in the upper part thereof.

11. A device as claimed in claim 7, wherein said abutment means including a substantially planar portion of said abutment surface located at the top of the chamber, said outlet means comprises a plurality of outlet apertures each having an opening through said planar portion and which planar portion extends transversely at an angle of at least 45° to the path of the upwardly directed air stream.

12. A compressed air operated dispenser device for separating and dispensing small elongate workpieces such as, for example, small screws, rivets, helical coil springs, pins and other lightweight small metal components of elongate form, said dispenser device comprising:
(a) a dispensing chamber having side walls and effective to contain a quantity of the workpieces,
(b) air supply means for blowing compressed air into the dispensing chamber to create turbulence effective to agitate and carry upwards at least some of the workpieces therein,
(c) outlet means located in the upper part of the chamber and having an outlet passage facing inwardly into the chamber,
(d) said outlet passage being laterally spaced with respect to one of said side walls to permit individual workpieces entrained in the air flow to pass successively in single file therethrough in relative endwise oriented and aligned relationship to discharge together with the compressed air, and
(e) abutment means disposed within aid dispensing chamber and including an abutment surface against which the workpieces are forcibly directed while entrained in the air flow,
(f) the dispensing chamber is formed by a trough having side walls and a substantially U-shaped configuration in transverse vertical cross-section,
(g) said air supply means including inlet means comprising a series of jet orifices spaced along the length of the trough in the upper part thereof and effective to blow the compressed air downwardly into the bottom part adjacent one side wall,
(h) the interior bottom surface of the trough being effective to deflect the compressed air through an angle of at least 180° and to cause it to be projected upwardly adjacent the opposite side wall toward the outlet passage.

13. A device as claimed in claim 12, wherein said abutment means includes an inwardly projecting longitudinal ridge member disposed on the interior surface of the trough to give said interior surface the required profile for directing the compressed air toward the outlet means.

14. A device as claimed in claim 12, wherein two block structures disposed at the top of the opposite side walls respectively include said inlet means and said outlet means.

15. A device as claimed in claim 12, wherein a single block structure located at the top of the trough includes said inlet means and said outlet means.

16. A device as claimed in claim 12, wherein thr trough is of substantially rectangular form in horizontal cross-section and is mounted so as to extend transversely in a box-like casing which supports a control for the air supply means.

* * * * *